United States Patent [19]

Ryczek

[11] 4,195,644
[45] Apr. 1, 1980

[54] STONE GUARD FOR HARVESTERS

[75] Inventor: William G. Ryczek, Kansas City, Mo.

[73] Assignee: Allis-Chalmers Corporation, Milwaukee, Wis.

[21] Appl. No.: 969,943

[22] Filed: Dec. 15, 1978

[51] Int. Cl.² ............................................. A01F 12/16
[52] U.S. Cl. .................................................. 130/27 JT
[58] Field of Search ........................ 130/27 R, 27 JT; 56/14.6

[56] References Cited

U.S. PATENT DOCUMENTS

| | | | |
|---|---|---|---|
| 2,305,159 | 12/1942 | Heckman et al. | 130/27 JT |
| 2,528,232 | 10/1950 | Krause | 130/27 JT |
| 2,959,175 | 11/1960 | Oberhaltz et al. | 130/27 JT |
| 3,576,188 | 4/1971 | Tanis | 130/27 JT |
| 3,643,666 | 2/1972 | Denison | 130/27 JT |
| 3,645,269 | 2/1972 | Peruski | 130/37 JT |
| 3,648,709 | 3/1972 | DeCoene | 130/27 JT |
| 3,664,348 | 5/1972 | Maiste et al. | 130/27 JT |
| 3,756,248 | 9/1973 | Mathews | 130/27 JT |
| 3,771,530 | 11/1973 | Wassell | 130/27 JT |
| 3,971,390 | 7/1976 | McDuffie et al. | 130/27 JT |

Primary Examiner—Russell R. Kinsey
Attorney, Agent, or Firm—Robert C. Sullivan

[57] ABSTRACT

A stone guard for use with a harvester or combine of the type having a rotatable threshing cylinder and a concave lying contiguous and radially outwardly of the threshing cylinder whereby grain is threshed from a crop fed by a feeder means to the interspace between the threshing cylinder and the concave. A stone guard door is interposed in the crop flow path between the feeder means and the interspace between the threshing cylinder and the concave. The stone guard door comprises a main body portion which is pivotally connected to stationary combine structure contiguous the discharge end of the feeder means, and a lip portion hingedly connected to the main body portion. A detent means carried by the stone guard door normally maintains the lip poriton rigid with respect to the main body portion. The lip portion normally rests on the forward edge of the concave when the detent means is engaged, whereby to maintain the stone guard door in a closed position. The detent means is adapted to be released by the force or impact of a stone or the like on the stone guard door. Release of the detent means permits the lip portion to pivotally move about its hinged connection to the main body portion, causing the lip portion to drop off the edge of the concave. This permits the stone guard door to drop by gravity about the pivotal connection of the main body portion to the combine structure, to thereby discharge the stone or the like before it reaches the interspace between the threshing cylinder and the concave. The main body portion of the stone guard door is pivotally mounted on a rotatable shaft, and means are provided interconnecting the rotatable shaft and the stone guard door whereby rotation of the shaft either manually or by power means causes reclosing and relatching of the stone guard door. An auxiliary detent means is provided and is operatively related to the lip portion of the stone guard door to maintain the lip portion in fully open unlatched position after the stone guard door has moved to open position, in order to insure that during the relatching operation the stone guard door can move upwardly beyond and in clearing relation to the forward edge of the concave.

10 Claims, 12 Drawing Figures

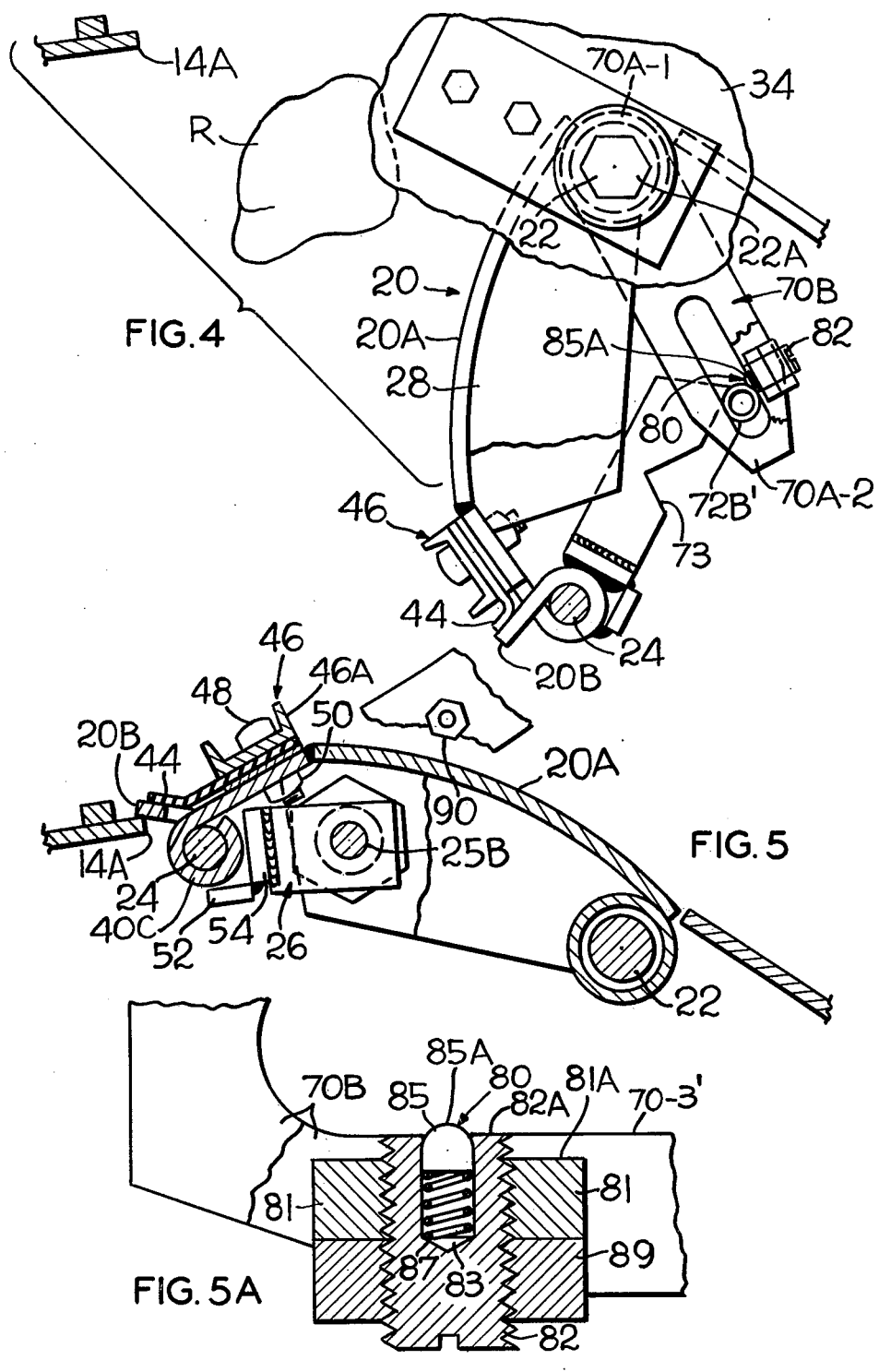

STONE GUARD FOR HARVESTERS

TECHNICAL FIELD

This invention relates to a harvesting machine or agricultural combine of the type having a threshing cylinder and a cooperating concave, and more particularly to a device for preventing rocks or the like from entering into the interspace between the threshing cylinder and the cooperating concave which would cause damage to the threshing mechanism.

BACKGROUND OF PRIOR ART

The threshing mechanism of a conventional agricultural combine or harvester includes a large rotating threshing cylinder and a contiguous concave which cooperate to thresh the grain from the crop passing between the cylinder and the concave. The crop which is being harvested is delivered to the threshing mechanism comprising the threshing cylinder and the cooperating concave from a harvesting platform or header located at the forward end of the agricultural combine. Occasionally when the combine is operating in rocky regions, the header will pick up a rock along with the crop and unless the rock is removed before it enters between the threshing cylinder and cooperating concave, extensive damage may be caused to the threshing mechanism.

It is well known in the prior art to provide a stone guard or stone trap which is mounted on the agricultural combine and which intercepts the rock or stone before it passes between the threshing cylinder and concave. The following United States patents Nos. show representative stone guards or stone traps for use with combines:

- 2,528,232—Krause
- 2,959,175—Oberholtz et al
- 3,527,233—Mathews
- 3,576,188—Tanis
- 3,643,666—Denison
- 3,648,709—De Coene
- 3,664,348—Maiste et al
- 3,756,248—Mathews
- 3,771,530—Wassell
- 3,971,390—McDuffie et al.

It is an object of the present invention to provide a stone guard for use on an agricultural harvester or combine which provides an outlet or discharge for rocks, stones or other undesirable foreign objects before they enter and damage the threshing mechanism of the combine, and in which the stone guard door which opens to discharge rocks or the like is normally sealed its entire width during normal operation, with the normal movement of the crop being harvested tending to improve the seal rather than tending to destroy the seal.

It is a further object of the invention to provide a stone guard for agricultural harvesters or combines to prevent the entrance of stones, rocks or the like into the threshing mechanism, and having a stone guard door which latches across its entire width.

It is a further object of the invention to provide a stone guard for use with agricultural harvesters or combines which may be manually operated to reclosed position by an operator located in a safe standing position beside the combine rather than requiring reclosing of the stone guard by an operator lying beneath the combine as is required in some prior art constructions.

It is a further object of a modified form of the invention to provide a stone guard door for use with agricultural harvesters or combines which may be moved to closed relatched position by a power operated means such as a hydraulic ram which may be controlled by the operator from a remote location such as the operator's platform.

In achievement of these objectives, there is provided in accordance with the invention in an agricultural harvester or combine of the type having a threshing mechanism comprising a rotatable threshing cylinder and a concave lying contiguous and radially outwardly of said cylinder whereby grain is threshed from a crop passing between said cylinder and said concave, and a feeder means carried by said combine and adapted to feed a crop to be threshed to the interspace between said cylinder and said concave, the improvement which is characterized by a stone guard door interposed in the crop flow path between said feeder means and said interspace and adapted to discharge a stone or the like before it reaches said interspace, whereby to prevent damage by said stone to said threshing mechanism, said stone guard door comprising a main body portion pivotally connected contiguous its forward edge to stationary combine structure contiguous the discharge end of said feeder means, a lip portion hingedly connected contiguous its forward edge to the rearward edge of said main body portion, detent means for normally maintaining said lip portion rigid with respect to said main body portion, said lip portion normally resting on the edge of said concave when said detent means is engaged whereby to maintain said stone guard door in a closed position in which it serves as a path for crop moving from said feeder means to said interspace, said detent means being adapted to be released by the force or impact of a stone or the like on said stone guard door, release of said detent means being effective to permit said lip portion to move about said hinged connection to said main body portion, whereby to permit said lip portion to drop off said edge of said concave to permit said stone guard door to drop down by gravity about the pivotal connection of said main body portion to the combine structure, and thus whereby to discharge said stone or the like before it reaches said interspace.

Further objects and advantages of the invention will become apparent from the following description taken in conjunction with the accompanying drawings in which:

FIG. 1 is a fragmentary view in elevation showing a threshing cylinder and a cooperating concave and also showing the stone guard door of the invention in normal operating position before it has been actuated to open position by the presence of a rock, stone or the like;

FIG. 4 is a view of the stone guard door and the operating mechanism thereof in the fully open position of the stone guard door in which it is discharging a stone before it reaches the threshing mechanism;

FIG. 5 is a view taken along line V—V of FIG. 3A;

FIG. 5A is an enlarged view in section of the auxiliary detent arrangement used to retain the lip of the stone guard door in fully open unlatched position;

DETAILED DESCRIPTION OF THE INVENTION

Figure 1:
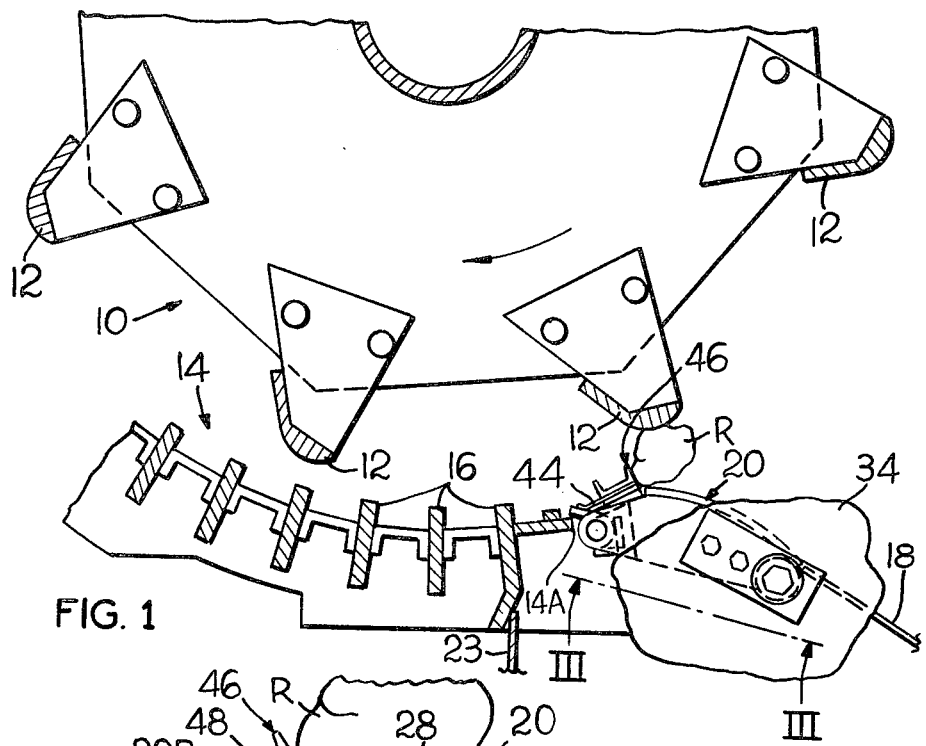

Referring now to the drawings and more particularly to FIG. 1, there is shown a rotatable threshing cylinder generally indicated at 10 of an agricultural combine, cylinder 10 having a plurality of circumferentially spaced grain engaging bars 12 secured thereto. A concave generally indicated at 14 lies radially outwardly of threshing cylinder 10 at an adjustably fixed position and includes a plurality of circumferentially spaced bars 16 which cooperate with bars 12 of threshing cylinder 10 to thresh the grain out of the crop fed into the interspace between threshing cylinder 10 and concave 14, as is well known in the art. The cut crop is delivered to the threshing zone by a feeder platform 18 which cooperates with a straw elevator (not shown).

The threshed material passes downwardly through peripheral openings in the concave where the threshed material may be further processed and/or collected in a grain pan or the like, as shown, for example, in U.S. Pat. No. 4,007,744 of J. Lyle Shaver.

Throughout the specification and claims, the terms "forward" and "rearward" are with reference to the normal direction of travel of the combine. Thus, the "forward" portion of a particular element is the portion thereof closer to the normally front end of the combine, while the "rearward" portion of a given element is the portion thereof furthest away from the front end of the combine.

The space between the rearward discharge edge of feeder means 18 and the forward edge 14A of concave 14 is spanned by the stone guard of the invention, which is in the form of a stone guard door generally indicated at 20.

Stone guard door 20 normally bridges the space between the rearward edge of crop feeder 18 and forward edge 14A of concave 14, the crop which is delivered by crop feeder 18 passing over stone guard door 20 onto forward edge 14A of concave 14, where the crop passes for threshing into the interspace between threshing cylinder 10 and concave 14.

A vertical wall member 23 (FIG. 1) separates the region beneath concave 14 into which threshed material drops after passing through the concave from the space on the opposite or right-hand side (relative to FIG. 1) of wall 25 through which a stone discharged by stone guard door 20 drops to the ground.

Figure 2:
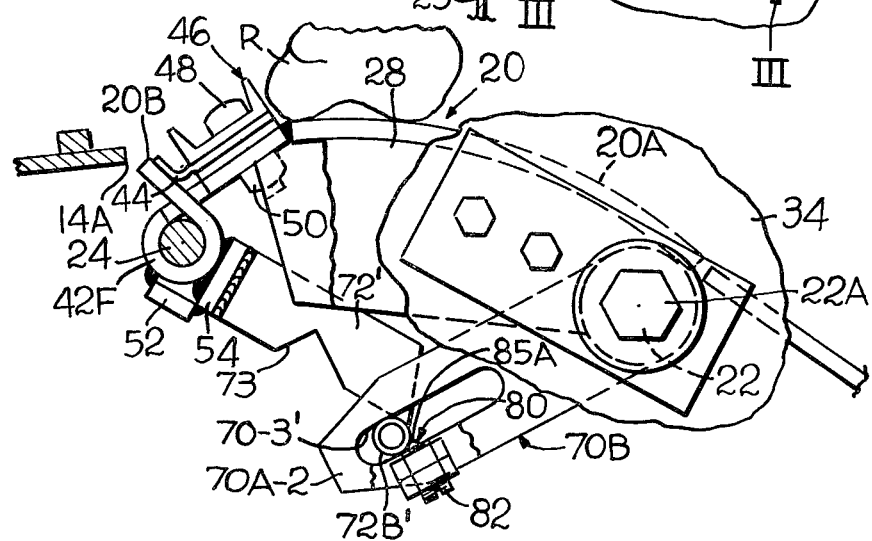
FIG. 2 is an enlarged view of the stone guard and of the operating mechanism thereof just after the lip of the stone guard door has dropped off the edge of the concave and the stone guard door is beginning to move to open position to permit discharge of a stone.

Stone guard door 20 comprises a main body portion indicated at 20A which is mounted at the forward portion thereof for pivotal movement about a pivotal axis defined by a shaft 22 supported by the stationary combine structure, as will be described more fully hereinafter. Stone guard door also comprises a lip portion 20B which is hingedly connected at the forward portion thereof to rod 24 which is supported by main body portion 20A. The rearward edge of main body portion 20A of stone guard door 20 is also hingedly connected to rod 24. The entire lateral width of the rearward edge of lip portion 20B of stone guard door 20 normally rests on forward edge 14A of concave 14 as seen in the views of FIGS. 1 and 5, to provide a seal between lip portion 20B and forward edge 14A of concave 14. However, as will be explained more fully hereinafter, when the detent mechanism generally indicated at 25 comprising the spring loaded plungers 25A and 25B becomes disengaged with respect to detent member 26, lip portion 20B of stone guard door 20 moves about its hinged connection to rod 24 to cause lip portion 20B to move out of engagement with forward edge 14A of concave 14 as seen in FIGS. 2 and 4, thereby permitting the entire stone guard gate 20 to move downwardly in a counter-clockwise direction relative to the pivotal axis defined by rod 22 and, as viewed in FIGS. 2 and 4, to an ultimate position such as that shown in FIG. 4. This permits the rock or stone R shown in FIGS. 1, 2 and 4 to drop downwardly to the ground without reaching concave 14, thereby preventing damage to the threshing mechanism.

Figure 3A:
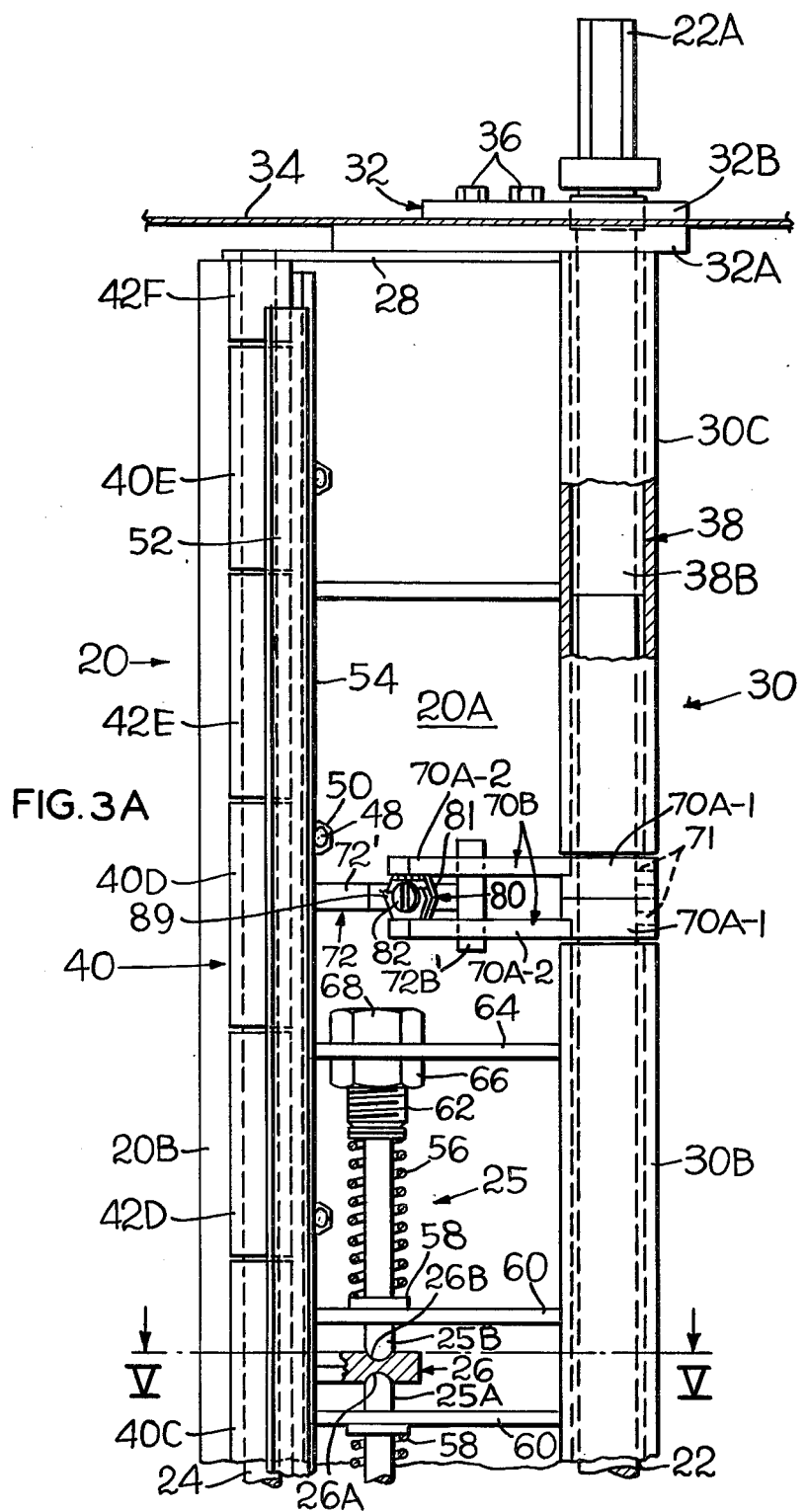
FIGS. 3A and 3B are a composite view taken together and as seen along line III—III of FIG. 1.
Figure 3B:
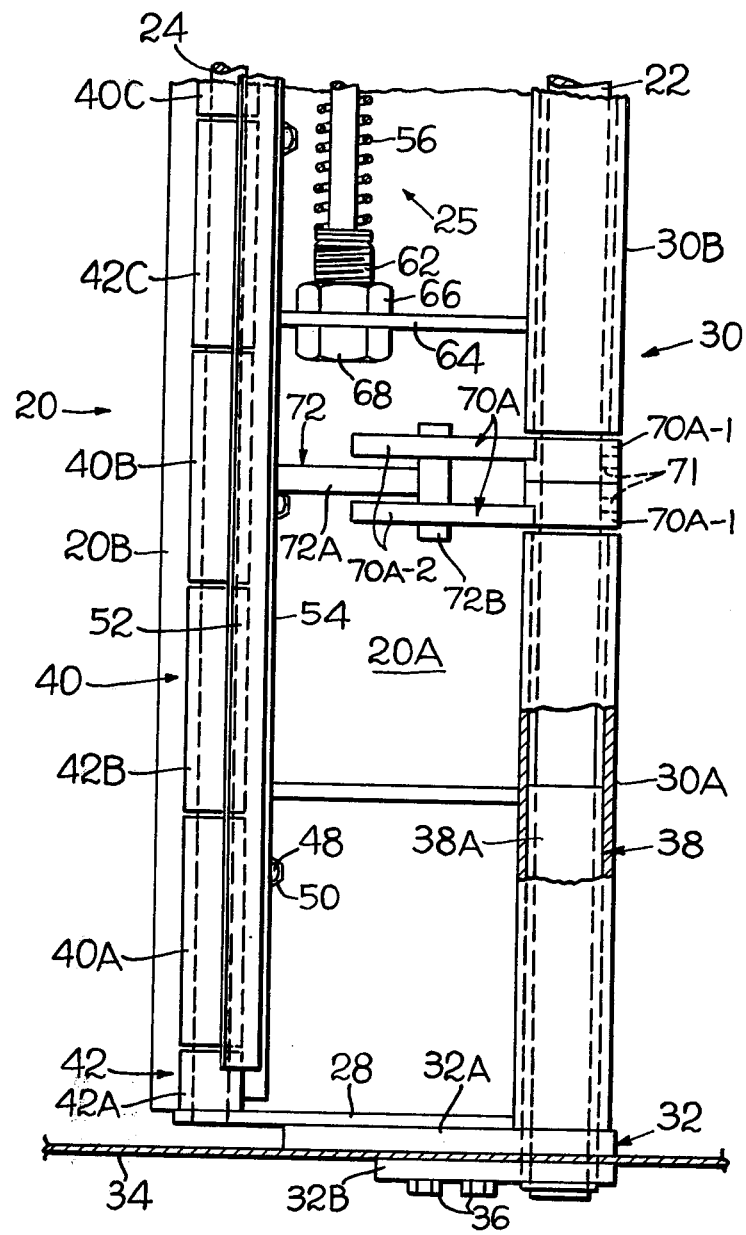

As best seen in the views of FIGS. 3A, 3B and 5, main body portion 20A of the stone guard door is of arcuate contour and includes rib-like members each indicated at 28 which are rigidly fixed as by welding to the oppositely disposed lateral ends of main body portion 20A.

At the forwardly disposed end of main body portion 20A of stone guard door 20, there are rigidly secured thereto as by welding a plurality of tubular sleeve members generally indicated at 30 but individually indicated at 30A, 30B, and 30C.

Contiguous each of the opposite lateral ends of stone guard door 20 a stationary bearing structure generally indicated at 32 is provided and comprises a pair of stationary bearing plates respectively indicated at 32A and 32B which are positioned in abutting relation to and on opposite sides of the stationary wall 34 of the combine structure, the combine wall 34 being sandwiched between the laterally inner bearing plate 32A and the laterally outer bearing plate 32B at each end of the stone guard door structure. Bolts 36 extend through passages in outer bearing plate 32B and into threaded engagement with threaded passages in inner bearing plate 32A. At each end of the stone guard door, sleeve members generally indicated at 38 and specifically at 38A and 38B are received within the respective outer tubular bearing sleeves 30A and 30C contiguous each end of the stone guard door, the corresponding inner bearing sleeve 38A or 38B, as the case may be, projecting through and slightly beyond the corresponding stationary bearing structure 32 at each end of stone guard door 20. Shaft 22 projects the entire length of the forward end of stone guard door 20, shaft 22 being coaxially positioned relative to and within outer bearing sleeves 30A, 30B and 30C and also being coaxially positioned relative to and within the oppositely disposed inner bearing sleeves 38A and 38B.

The rearward end of main body portion 20A of stone guard door 20 is provided with hinge elements generally indicated at 40 and individually indicated at 40A, 40B, 40C, 40D and 40E which receive the pivot or hinge rod 24 which extends the entire length of the rearward end of stone guard door 20. Hinge rod 24 is nonrotatably supported by rib members 28 at opposite lateral ends of main body portion 20A. Rod 24 is nonrotatable but serves as a pivotal axis about which lip portion 20B of stone guard door 20 can pivot with respect to main body portion 20A when lip portion 20B becomes unlatched with respect to main body portion 20A, as will be explained more fully hereinafter. Similarly, lip portion 20B of stone guard door 20 includes hinge elements generally indicated at 42 but specifically indicated at 42A, 42B, 42C, 42D, 42E, and 42F, and which receive hinge rod 24. As best seen in the views of FIGS. 3A and 3B, hinge elements 40 of main door portion 20A and hinge elements 42 of lip portion 20B are alternated along hinge rod 24 in the manner of a "piano hinge."

A seal element 44 of a suitable material such as rubber, rubber-like, or elastomeric material and in strip form is superimposed above the upper surface of main body portion 20A contiguous the rearward edge of main body portion 20A and in overlying relation to all of the hinge elements 42 of lip portion 20B as well as being in overlying relation to all of the hinge elements 40 of main body portion 20A of stone guard door 20. Seal strip member 44 extends for the entire lateral width of stone guard door 20 and serves to prevent the threshed material from falling through openings in the hinge connection between main door portion 20A and lip portion 20B. An abutment member generally indicated at 46 of generally channel shape also extends for the entire lateral width of stone guard door 20 and in overlying relation to sealing strip 44. Suitable fastening means such as bolts 48 and nuts 50 are located at suitable laterally spaced intervals along the rearward portion of main body portion 20A of door 20 to secure abutment member 46 securely in position on main body portion 20A.

In order to structurally reinforce lip portion 20B of the stone guard door, a first bar member 52 extends laterally for substantially the entire lateral width of the hinge portion of lip portion 20B, bar 52 being welded or otherwise suitably attached to the under surface of hinge elements 42A, 42B, 42C, 42D, 42E and 42F of lip portion 20B, but not being attached to the hinge elements 40 of main body portion 20A of the stone guard door. The structural reinforcing arrangement for lip portion 20B also includes a second bar member 54 positioned substantially at a right angle to the first bar member 52 and also extending for substantially the entire lateral width of the hinge portion of lip portion 20B. Bar 54 is also welded or otherwise suitably secured to the forwardly facing surfaces of hinge elements 42A, 42B, 42C, 42D, 42E and 42F of lip portion 20B. Bar 54 is not secured to hinge elements 40 of main door portion 20A. Thus, the lip portion 20B, including hinge elements 42 thereof and the laterally extending reinforcing bars 52 and 54, are all one unitary structure.

As best seen in the composite view of FIGS. 3A and 3B, a detent bar generally indicated at 26 is rigidly secured as by welding to substantially the midpoint of the underside of lip portion 20B. Detent bar 26, as best seen in the views of FIGS. 3A and 5, is welded to the forwardly facing surface of the laterally extending reinforcing bar 54 of lip portion 20B and is in underlying relation to main body portion 20A of the stone guard door. Detent bar 26 includes detent notches 26A and 26B (FIG. 3A) in the opposite lateral faces thereof.

A pair of spring biased plungers generally indicated at 25 but specifically designated at 25A and 25B positioned on the underside of main body portion 20A of stone guard door 20 are adapted to engage detent notches 26A and 26B of detent member 26 whereby to secure main body portion 20A and lip portion 20B of stone guard door 20 in a fixed relation with respect to each other. Each of the spring biased plungers 25A, 25B includes a nose portion which is adapted to engage the corresponding detent notch 26A, 26B of detent 26 as seen in the view of FIG. 3A. Each plunger 25 also includes a biasing spring 56 which seats against a shoulder 58 fixed on the laterally inner end of each respective plunger 25.

The laterally inner end of each plunger 25 is supported for sliding movement by a suitable bearing aperture in a corresponding rib member 60 which is rigid with main body portion 20A of door 20. The opposite or laterally outer end of each spring 56 seats on the laterally inner end of a corresponding threaded stud member 62 which extends through a corresponding rib member 64 which is rigidly secured to or forms part of main body portion 20A. Nut members 66 and 68 are in threaded engagement with stud member 62 on opposite sides of rib 64 and maintain threaded stud 62 in the desired adjusted position relative to plunger 25 and to rib member 64. One end of stud 62 has a recess into which one end of plunger 25 can move when the nose end of each respective plunger 25 moves out of engagement with the detent notch 26A or 26B of the detent member 26.

DESCRIPTION OF RELATCHING MECHANISM

In order to permit relatching of the stone guard door after it has become unlatched to discharge a stone or stones therethrough, a relatching mechanism is provided which will now be described.

It will be noted that a space is provided contiguous the forward edge of main body portion 20A between sleeve members 30A and 30B; and, similarly, a space is also provided between sleeve member 30B and 30C. In the space between sleeve members 30A and 30B, a pair of laterally spaced crank members each generally indicated at 70A is positioned. Each of the crank members 70A includes a corresponding ring-shaped terminal portion 70A-1 which encircles the rotatably mounted shaft 22 supported by bearing sleeves 30. Each of the ring-shaped portions 70A-1 is fixed secured to shaft 22 in any suitable manner as, for example, by means of a setscrew 71. Each of the crank members 70A includes a crank arm 70A-2. Each of the crank arms 70A-2 is provided with a corresponding elongated slot 70-3 therein. Cooperating with the pair of crank members 70A is a corresponding operator member generally indicated at 72 comprising an arm 72A which is welded at its rearward end to the laterally extending reinforcing bar 54 which forms part of the structure of lip 20B of stone guard door 20. Arm 72A is so positioned as to be spaced substantially midway between the two corresponding crank arms 70A-2. The forward end of operator arm 72A has fixed thereto a pintle-like member 72B which extends through and is adapted to ride in the laterally spaced slots 70-3 of the respective corresponding pair of crank arms 70A-2.

On the opposite lateral side of the stone guard door structure, a second pair of crank members generally indicated at 70B are mounted on shaft 22 in the same manner as just described in connection with crank members 70A. The second pair of crank members 70B cooperate with an operator member 72' which is secured to reinforcing bar 54 of lip structure 20B in the same manner as just described in connection with operator member 72. Operator member 72' includes a pintle-like member 72B' similar to the pintle-like member 72B of operator member 72 previously described. Pintle-like member 72B' of operator member 72' is received in and engages slots 70-3' in crank arms 70B in the same manner as described in connection with crank members 70A.

Description of Auxiliary Detent Arrangement For Holding Lip of Stone Guard Door in Fully Open, Unlatched Position In order to hold lip 20B of stone guard door 20 in fully open or unlatched position after door 20 has become unlatched due to the presence of a rock or the like, an auxiliary detent arrangement generally indicated at 80, FIGS. 2, 3A, 4, 5A and 6-9, inclusive, is provided as will now be described. The purpose of auxiliary detent arrangement 80 is to insure that lip portion 20B is maintained in a fully open unlatched position after having become unlatched due to the presence of a rock or the like, whereby to insure that stone guard door 20, including main door portion 20A and lip portion 20B, can move upwardly past and in clearing relation to forward edge 14A of concave 14 during the relatching procedure to be hereinafter described.

Figure 6:
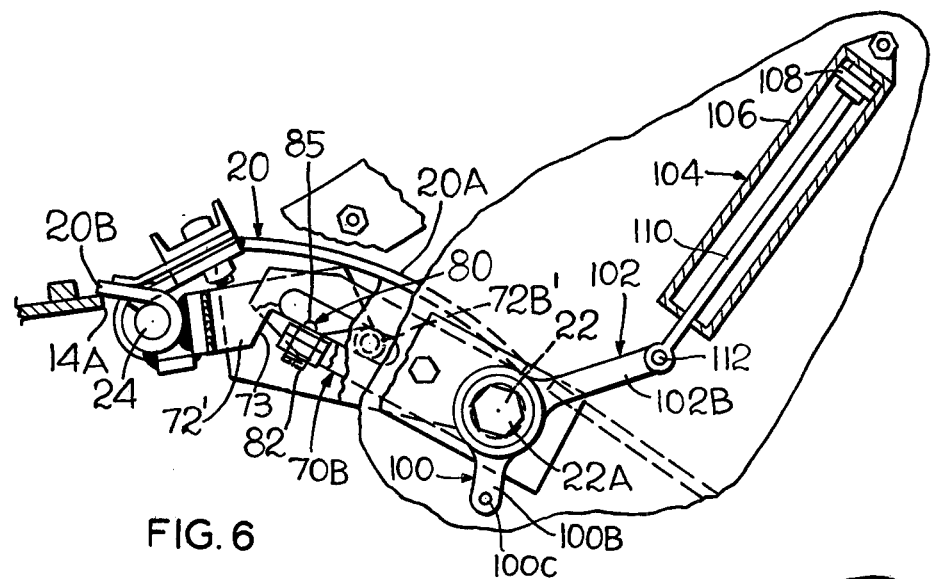
FIG. 6 is a view of the stone guard door in its normally closed position and additionally showing a power operated mechanism in the form of a hydraulic ram which may be used for relatching of the stone guard door after it has been tripped to open position.

As best seen in the views of FIGS. 1, 5 and 6, when stone guard door 20 is in its fully latched and closed position, lip portion 20B of the door lies above and rests on forward edge 14A of concave 14. Hence, it is necessary during the relatching procedure, to be hereinafter described, that lip portion 20B be so positioned as to permit it to move upwardly beyond and in clearing relation to forward edge 14A of concave 14 during the relatching procedure.

As shown in FIGS. 2, 3A, 4, 5A and 6-9, inclusive, auxiliary detent mechanism 80 comprises a nut member 81, which is rigidly secured as by welding, to one pair of crank members 70. More specifically, nut member 81 is mounted between and suitably secured to the two crank members 70B, as shown in FIG. 3A. Nut member 81 is provided with an internally threaded passage therethrough which receives a set-screw 82. Set-screw 82 is provided with external threads with engage the internal threads of the passage through nut 81. Set-screw 82 can therefore be adjusted to an optimum position along the internally threaded passage in nut 81. A lock nut 89 engages the external threads on set-screw 82 and can be tightened up against the surface of nut member 81 to prevent any movement of set-screw 82 out of a given adjusted position.

As best seen in the view of FIG. 5A, the end surface 81A of nut 81 is located in spaced relation away from the edge of crank arm slot 70-3' along which pintle 72B' moves. Also, the end surface of 82A of set-screw 82 is shown as positioned flush with the edge of slot 70-3'. Thus, only the rounded end 85A of detent plunger 85 (to be described) extends into slot 70-3' of each respective crank arm 70B and into the path of movement of pintle 72B'.

Set-screw 82 is provided with a cavity 83 therein which receives a detent plunger 85. A spring member 87 is positioned within the cavity 83 in set-screw 82 and urges rounded nose end 85A of detent plunger 85 outwardly beyond the internal cavity 83 of set-screw 82 to a position such as that shown in FIGS. 2 and 4 in which the rounded nose end 85A of the detent plunger projects beyond the end of set-screw 82 and into the path of pintle 72B'. The end opening in cavity 83 of set-screw 82 through which rounded nose end 85A of detent plunger 85 projects is reduced in size by peening or the like to prevent detent plunger 85 from moving more than a predetermined distance beyond the end of set-screw 82. However, detent plunger 85 can be pushed inwardly into cavity 83 in set-screw 82 against the force of the biasing spring 87. This permits pintle member 72B' to move along slots 70-3' in crank arms 70B from one side of detent plunger 85, such as from the position of pintle member 72B' shown in FIGS. 2 and 4 and corresponding to the unlatched position of the stone guard door, to a position on the opposite side of detent plunger 85 such as that shown in FIG. 6, and corresponding to the closed and latched position of stone guard door 20.

In order to accommodate detent mechanism 80 when stone guard door 20 is in the closed, latched position shown in FIGS. 1, 5 and 6, operator member 72' carried by lip member 20B of stone guard door 20 is provided with a V-shaped notch 73 therein into which detent mechanism 80 carried by crank arms 70B moves when stone guard door 20 is in its final closed and latched position.

Since pintle member 72B' is secured to operator member 72' which, in turn, is rigidly secured to lip portion 20B of stone guard door 20, it can be seen that when pintle member 72B is retained by detent plunger 85 in the position shown in the views of FIGS. 2, 4, 7 and 8, the lip portion 20B of stone guard door 20 is maintained in its fully open, unlatched position whereby to permit stone guard door 20 to move past and in clearing relation to forward edge 14A of concave 14 during the relatching procedure to be described hereinafter.

DESCRIPTION OF OPERATION

In the normal operating position, the stone guard door is in the position shown in FIGS. 1 and 5 of the drawings in which lip portion 20B rests on forward edge 14A of concave 14.

In the closed position of the stone guard door 20 shown in FIGS. 1, 5 and 6, spring-biased detent plungers 25A and 25B are respectively in engagement with detents 26A and 26B. Also, when stone guard door 20 is in the closed position of FIGS. 1, 5 and 6, pintle 72B' carried by operator member 72 is positioned to the right of detent plunger 85 relative to the views in FIGS. 1, 5 and 6.

Assume now that a rock or stone R is delivered by feeder means 18 toward the threshing space between threshing cylinder 10 and concave 14. The presence of rock R between rotating cylinder 10 and stone guard door 20 sets up forces which will cause detent plungers 25 to move out of detents 26A and 26B of detent member 26.

Since detent member 26 is fixed to lip portion 20B, the release of plungers 25 from detent 26 will permit lip portion 20B to rotate in a clockwise direction relative to the views shown in FIGS. 1 and 5 about the pivotal axis of pivot rod 24. This permits lip portion 20B to move clear of forward edge 14A of concave 14 so that the entire stone guard door 20 can then swing downwardly by gravity in a counterclockwise direction relative to the views shown in the drawings about the pivotal axis of rod 22 to ultimately assume the position shown in FIG. 4 of the drawings, thereby permitting rock R to drop downwardly onto the ground, thus preventing rock R from passing into the threshing mechanism. The downward pivotal movement of main body portion 20A about pivot rod 22 carries with it the hinged lip portion 20B. Relatch operator members 72 and 72' move downwardly with lip portion 20B to which they are attached. Pintles 72B and 72B' of the respective relatch operator members 72 and 72' move in the slots of the corresponding crank arms 70A, 70B, thereby camming crank members 70A, 70B downwardly in a counterclockwise direction relative to the views shown in the drawings to an ultimate position such as that shown in FIG. 4. During the clockwise movement relative to the views of FIGS. 1 and 5 of lip portion 20B during the unlatching movement just described, pintle 72B' moves from right to left over detent plunger 85, causing detent plunger 85 to depress against the force of biasing spring 87 to permit pintle 72B' to move across the nose end 85A of plunger 85 to the position shown in FIGS. 2, 4, 7 and 8 in which pintle 72B' is on the left of detent plunger 85.

When pintle 72B' is located to the left of detent plunger 85 as shown in FIGS. 2, 4, 7 and 8 corresponding to the unlatched position of stone guard door 20, lip 20B of the door is maintained in its fully open unlatched position, whereby to insure that door 20 can move upwardly and in clearing relation to forward edge 14A of concave 14 during the relatching procedure. The counterclockwise movement of crank arms 70A, 70B moves pivot rod 22 in a counterclockwise direction relative to the views shown in the drawings since crank arms 70A, 70B are secured by means of setscrews 71 to rod 22, whereby rod 22 moves rotatably with crank members 70A, 70B.

MANUALLY OPERATED RELATCHING PROCEDURE

In order to relatch the stone guard door after it has dropped to an open position, such as that shown in FIG. 4, a wrench or other suitable tool is engaged with the hexagonal-shaped end portion 22A of shaft 22 which projects exteriorly of the combine, and shaft 22 is rotated in a clockwise direction relative to the view shown in FIG. 4, thereby rotating the relatching crank members 70A, 70B in a clockwise direction relative to FIG. 4. Crank members 70A are connected to operator member 72 through slot connection 70-3 in the crank members 70A, and crank members 70B are connected to operator member 72' through slot connection 70-3' in crank members 70B. Operator members 72, 72' in turn are fixedly secured to lip portion 20B of stone guard door 20.

Rotation of operator members 72, 72' due to the rotation of crank arms 70A, 70B as just described will cause a clockwise rotation relative to the view of FIG. 4 of the entire stone guard door 20 in a closing direction about the axis of shaft 22 until the upper surface of main door portion 20A abuts against the stop member 90 which will prevent any further clockwise movement of main body portion 20A of door 20 relative to the view of FIG. 4.

Figure 7:
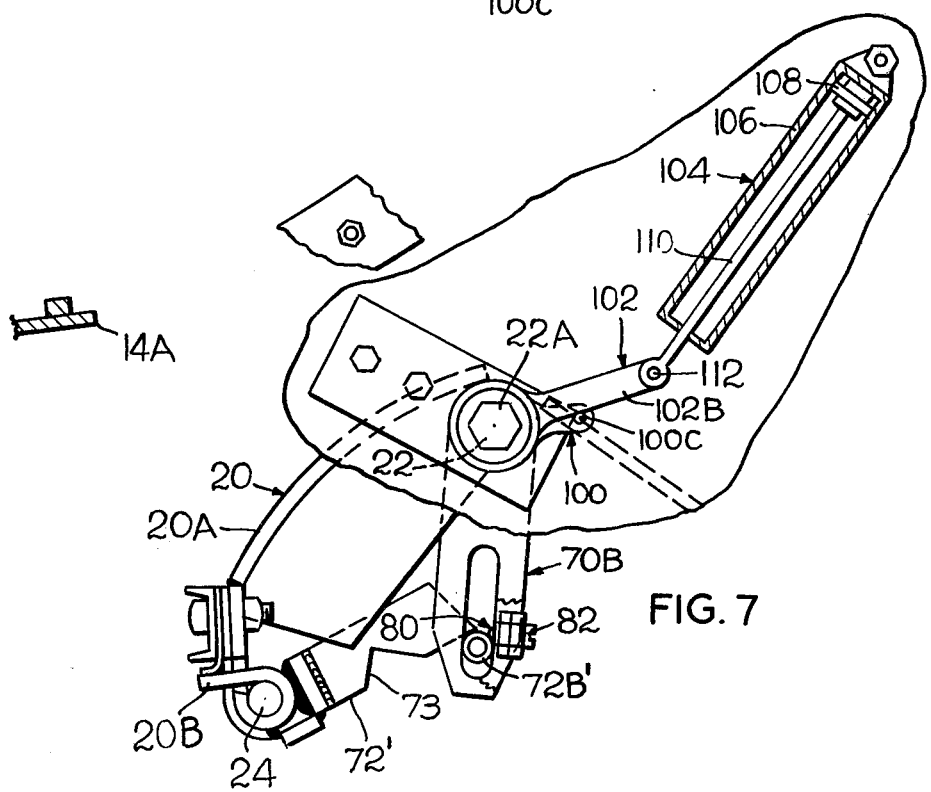
FIG. 7 is a view of the stone guard door and of the associated power operated relatching mechanism with the stone guard door being shown in its fully open position.

During the clockwise motion of stone guard door just described, lip portion 20B of the door will be maintained in its fully open unlatched position due to the location of pintle 72B' on the left of detent plunger 85 as shown in FIGS. 2, 4 and 7. As previously explained, this location of pintle 72B' permits stone guard door 20 to move upwardly beyond and in clearing relation to forward edge 14A of concave 14. However, when main body portion 20A of stone guard door 20 abuts against the abutment 90 in its path, as just described, and which prevents further upward movement of main body portion 20A, further clockwise rotation of shaft 22 relative to the views shown in the drawings will cause further corresponding clockwise rotation of relatching crank members 70 fixed to shaft 22 without a corresponding further upward movement of the main body portion 20A of the door 20, but such further rotation of relatching crank members 70 will cause a counterclockwise movement relative to FIG. 4 of operating members 72, 72' having the pintles 72B, 72B' which engage the slots in relatching crank members 70A, 70B. This counterclockwise rotation of the operating members 72, as just described, causes a corresponding counterclockwise rotation of lip portion 20B of stone guard door 20 relative to main body portion 20A of door 20 and about rod 24, causing detent member 26 which is secured to lip portion 20B to snap into detent relation relative to spring biased plungers 25, thereby causing lip portion 20B of stone guard door 20 to be relatched relative to main body portion 20A of the door. When the clockwise turning force is removed from shaft 22, as by removing the wrench from engagement with hexagonal-shaped end portion 22A of shaft 22, and with lip portion 20B latched with respect to main body portion 20A, the entire stone guard door 20 will move by gravity in a counterclockwise direction relative to the views in the drawings until lip portion 20B comes to rest on the upper surface of forward edge 14A of concave 14, which is the normal operating position of the stone guard door as shown in FIGS. 1, 5 and 6.

Power Operated Relatching Mechanism

Referring now to FIGS. 6-10, inclusive, there is provided a power-operated relatching mechanism for the stone guard door described in connection with FIGS. 1-5, inclusive. The stone guard door shown in connection with the power operated relatching mechanism is the same as that previously described in connection with the embodiment of FIGS. 1-5, inclusive, and will not be described again. In accordance with the present invention, a relatching crank generally indicated at 100 is provided with a hexagonal-shaped aperture 100A therein (FIG. 10) which is received on the hexagonal-shaped end portion 22A of shaft 22. Relatching crank 100 includes a radially extending crank arm 100B having a pin member 100C projecting laterally on opposite sides of the radially outer portion of arm 100B. Relatching crank 100 also includes a pair of circular shoulders each indicated at 100D which respectively project laterally on opposite sides of crank member 100 in concentric relation with hexagonal-shaped aperture 100A of the crank member.

Cooperating with relatching crank member 100 are two link members which are similar to each other and are each generally indicated at 102. The two link members 102 are functionally the same, the use of two link members 102 permitting pin 100C of relatching crank 100 to be engaged on opposite sides of relatching crank 100. Each link member 102 is provided with a circular opening 102A which permits the respective link member 102 to seat on and to be rotatably movable with respect to a corresponding one of the circular shoulders 100D on relatching crank member 100. Each of the operating link members 102 also includes an arm portion 102B which is provided at its radially outer end with an aperture 102C which adapts the link member 102 to be connected to a fluid-operated ram, as will now be described.

As shown in FIGS. 6-9, inclusive, a power operated ram generally indicated at 104 is provided which may be operated by a suitable fluid such as a hydraulic fluid or by a gaseous fluid. In describing power ram 104 and its operation, reference will be made to a hydraulic fluid. However, it will be understood that ram 104 may also be operated by a suitable gaseous fluid. Also, alternatively, motion could be applied to links 102 by a suitable electrical operating means, such as an electrical solenoid or the like. Hydraulic ram 104 includes a cylinder 106 in which a piston 108 and piston rod 110 are movable. The outer end of piston rod 110 is pivotally connected to the outer end of both of the operating links 102 by means of a connecting pin 112 which extends through rod 110 and through the two links 102, whereby movement of piston 108 and connecting rod 110 is communicated to links 102.

Referring now to FIG. 6 which shows stone guard door 20 in the same relative position as shown in FIGS. 1 and 5 in which the stone guard door 20 is in closed position, it will be noted that piston 108 and piston rod 110 are retracted upwardly the maximum possible distance into cylinder 106. In the position of stone guard door 20 and of the piston rod and piston shown in FIG. 6, connecting links 102 have been rotated about their bearing support on circular shoulders 100D of relatching crank 100 to the position shown in FIG. 6 in which links 102 are separated from arm 100B of relatching crank 100 by an angle of approximately 107 degrees.

Referring to FIG. 7 in which stone guard door 20 is shown in approximately its extreme open position, it will be noted that crank arms 70B have been rotated by the rotation of operating members 72' attached to lip portion 20B of door 20 through an angle of approximately 103 degrees from their position of FIG. 6. Since crank arms 70B are secured to shaft 22, the rotation of crank arms 70B has rotated shaft 22 through the same angular movement and in so doing has rotated relatching crank member 100 through a corresponding angular movement. However, the movement of stone guard door 20 and of crank members 70A and of relatching crank 100 from the closed position of FIG. 6 to the nearly fully open position of FIG. 7 has not caused any movement of connecting links 102, or of the piston 108 and of piston rod 110 in cylinder 106 of hydraulic ram 104 since shoulders 100D on relatching crank 100 have merely rotated about the circular inner periphery of link members 102 as a bearing.

Figure 8:
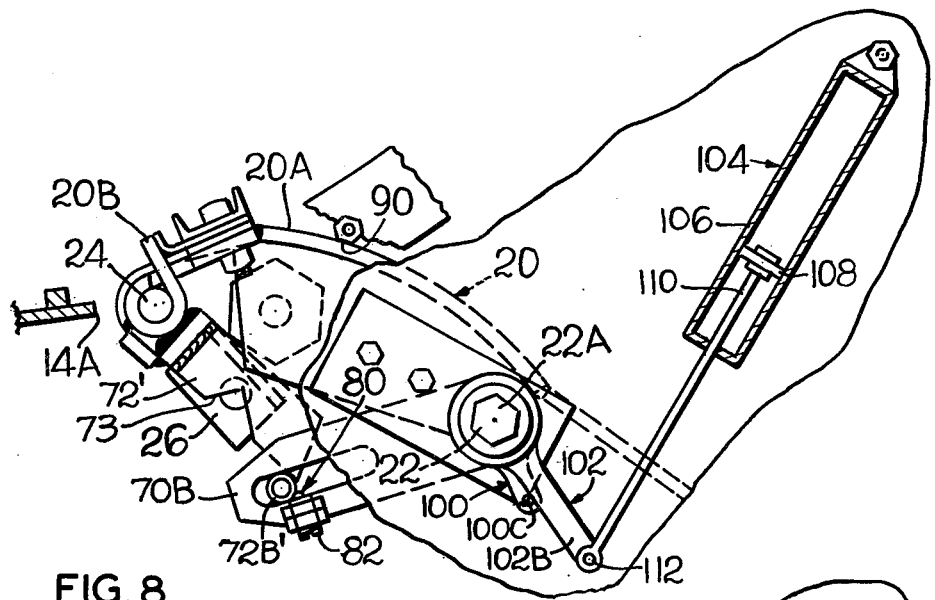
FIG. 8 is a view of the stone guard door and associated power relatching mechanism during the relatching procedure.
Figure 9:
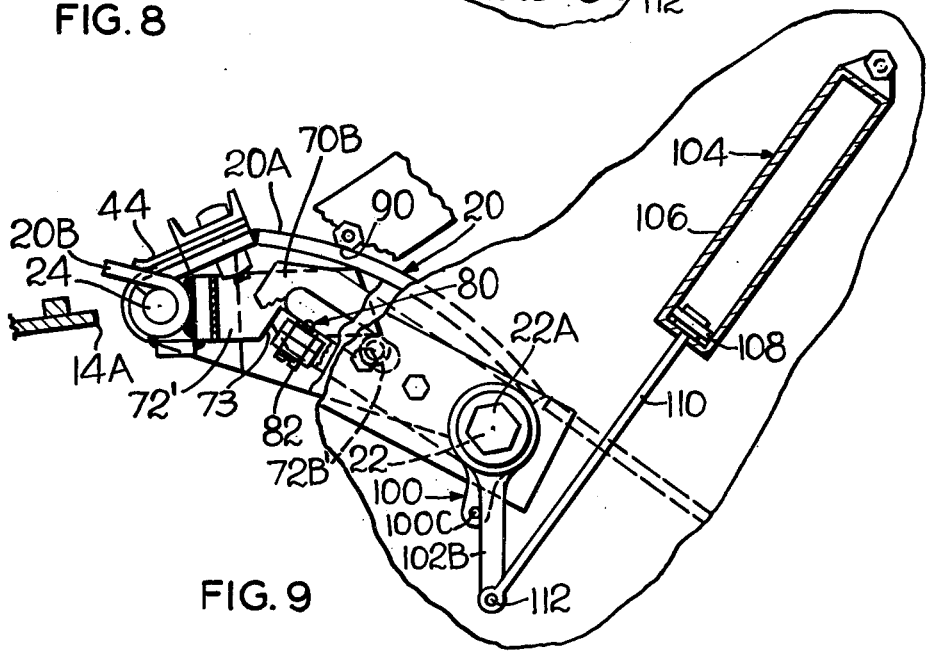
FIG. 9 is a view similar to FIG. 8 but showing a later phase of the relatching cycle.
Figure 10:
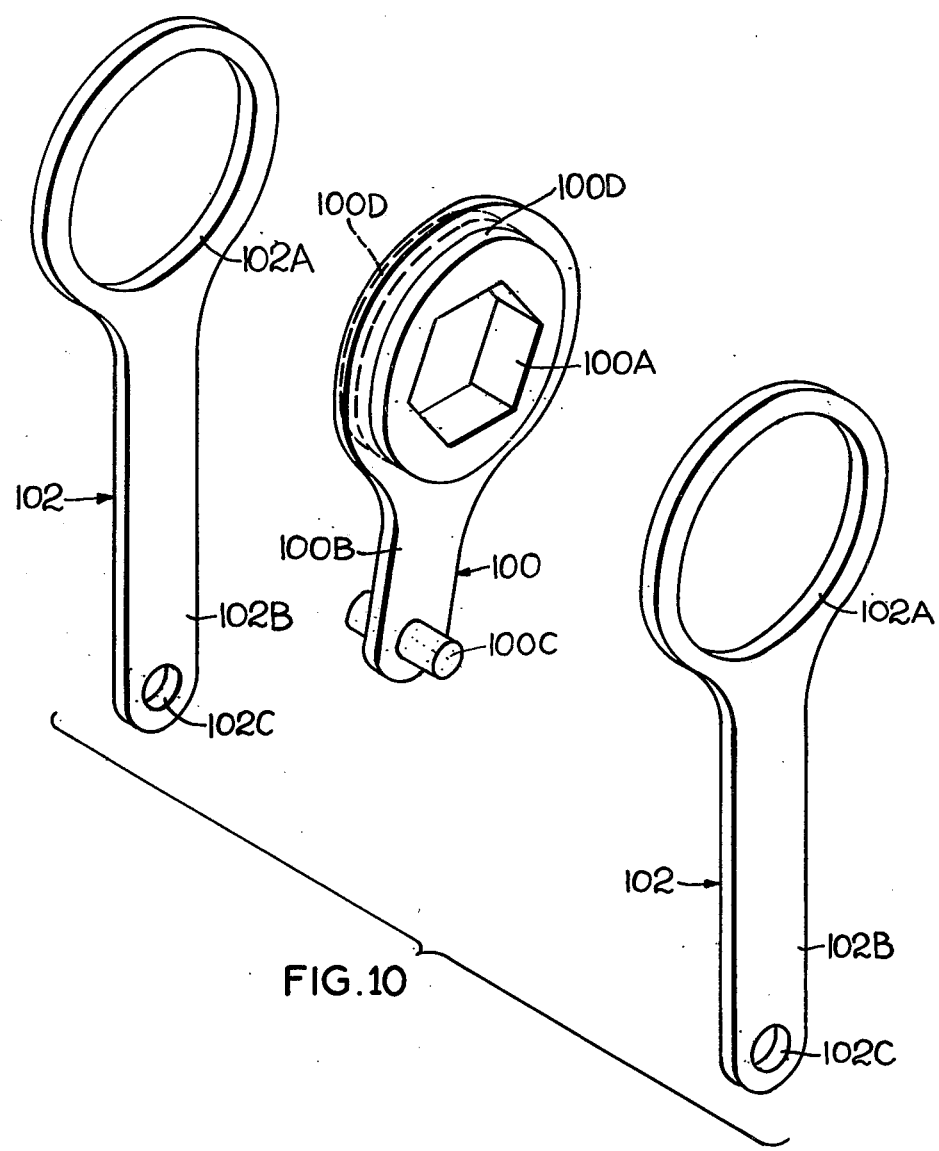
FIG. 10 is an exploded view of the relatching crank member and of the associated crank actuating lever means which form a part of the power operated relatching mechanism shown in FIGS. 6–9, inclusive.

Referring now to FIGS. 8 and 9 which show the relatching procedure using the power operated mechanism, it will be noted in FIG. 8 that the power fluid such as hydraulic fluid has been admitted to the interior of hydraulic ram cylinder 106 and has caused piston 108 to move downwardly to a position in the lower portion of hydraulic cylinder 106 although piston 108 has not reached the extreme limit of its downward travel in cylinder 106. The downward movement of piston rod 110 from the position of FIGS. 6 and 7 to the position of FIG. 8 has caused connecting links 102 which are connected to piston rod 110 to rotate in a clockwise direction on the circular shoulders 100D of relatching crank 100 relative to the views of FIGS. 7-9, inclusive, to cause the various parts to approach and reach the position of FIG. 8. During the movement of the two connecting links 102B from the position of FIG. 7 to the position of FIG. 8 caused by the movement of piston rod 110, the two links 102B will abut against pin member 100C which projects on either side of arm 100B of relatching crank 100 and will thereby cause connecting links 102B to rotatably drive relatching crank 100 in a clockwise direction relative to FIGS. 7 and 8. Since relatching crank 100 is keyed to the hexagonal end 22A of shaft 22, rotation of relatching crank 100 causes shaft 22 to rotate, thereby rotating the crank arms 70B in a clockwise direction relative to the view of FIGS. 7 and 8, causing clockwise movement of stone guard door 20 in the same manner as explained in connection with the manual relatching operation shown in the view of FIG. 5.

During the power-operated reclosing movement of stone guard door 20 as shown in FIGS. 8 and 9, the auxiliary detent 80 functions in the same manner as described in connection with the previously described embodiment of FIGS. 1-5, inclusive, to maintain lip portion 20B of the door in a fully open unlatched position to permit stone guard door 20 to move upwardly past and in clearing relation to forward edge 14A of concave 14 during the reclosing operation.

In the position of the various parts shown in FIG. 8, piston 108 is at a position in which main body portion 20A of stone guard gate 20 has just moved into abutting relation to stationary abutment 90. Further movement of piston 108 in cylinder 106 from the position shown in FIG. 8 to the position shown in FIG. 9, and with main body portion 20A of gate 20 abutting against abutment 90, will cause further rotation of crank arms 70 in a clockwise direction relative to the views of FIGS. 8 and 9, in such manner as to move operating members 72 and 72' and lip portion 20B to which operating members 72 and 72' are secured in a counterclockwise direction relative to the views of FIGS. 8 and 9 about the axis of rod 24. The counterclockwise movement of lip portion 20B as just described will cause detent bar 26 which is secured to and moves with lip portion 20B to also move in a counterclockwise direction relative to FIGS. 8 and 9 about the axis of rod 24 and will cause spring loaded plunger members 25 to snap into detent notches 26A and 26B of detent bar 26 whereby to relatch lip portion 20B relative to main body portion 20A of stone guard door 20.

After stone guard door 20 has been relatched as just explained, it will still be in the position shown in FIG. 8 in which door 20 is in abutting relation to abutment 90, with lip portion 20B of the door being raised above the level of forward edge 14A of concave 14. Pressure fluid may then be admitted to the lower end of hydraulic cylinder 106 beneath piston 108 to cause piston 108 to return to the position shown in FIGS. 6 and 7 of the drawings. The upward movement of piston 108 in cylinder 106 merely causes connecting links 102 to pivot about shoulders 100D of relatching crank member 100, the pivotal motion of links 102 relative to crank member 100 as just described not being effective to cause any motion of the other parts of the mechanism. However, since the clockwise force (relative to FIGS. 8 and 9) which had previously been exerted by piston 108 on door 20 has now been removed, door 20 will pivotally move downwardly by gravity about the axis of shaft 22 until lip portion 20B of the door again rests on forward edge 14A of concave 14, as shown in the view of FIG. 6.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In a harvester of the type having a threshing mechanism comprising a rotatable threshing cylinder and a concave lying contiguous and radially outwardly of said cylinder whereby grain is threshed from a crop passing between said cylinder and said concave, and a feeder means carried by said harvester and adapted to feed a crop to be threshed to the interspace between said cylinder and said concave, in which the improvement is characterized by a stone guard door interposed in the crop flow path between said feeder means and said interspace and adapted to discharge a stone or the like before it reaches said interspace, whereby to prevent damage by said stone to said threshing mechanism, said stone guard door comprising a main body portion pivotally connected contiguous its forward edge to stationary harvester structure contiguous the discharge end of said feeder means, a lip portion hingedly connected contiguous its forward edge to the rearward edge of said main body portion, detent means carried by said stone guard door for normally maintaining said lip portion rigid with respect to said main body portion, said lip portion normally resting on the edge of said concave when said detent means is engaged, whereby to maintain said stone guard door in a closed position in which it serves as a path for crop moving from said feeder means to said interspace, said detent means being adapted to be released by the force or impact of a stone or the like on said stone guard door, release of said detent means being effective to permit said lip portion to pivotally move about said its hinged connection to said main body portion to an open unlatched position in which said lip portion drops off said edge of said concave to permit said stone guard door to drop down by gravity about the pivotal connection of said main body portion to the harvester structure to discharge said stone or the like before it reaches said interspace.

2. In a harvester as defined in claim 1 in which said detent means comprises a detent member carried by one of said door portions and at least one spring-biased detent element carried by the other of said door portions, said spring biased detent element normally engaging said detent member for normally maintaining said lip portion rigid with respect to said main body portion, said spring-biased detent element being adapted to become disengaged from said detent member for the force or impact of a stone or the like on said stone guard door whereby to permit said lip portion to pivotally move about said hinged connection to said main body portion.

3. In a harvester as defined in claim 2 in which said detent member is fixed to one of said door portions substantially at the midpoint of the dimension of said door which extends in the direction of the hinge axis between said door portions, said detent member being adapted to receive in detent relation a pair of oppositely disposed detent elements lying on opposite lateral sides of said detent member, said pair of oppositely disposed detent elements being slidably supported by the other of said door portions and being adapted to normally engage said detent member for normally maintaining said lip portion rigid with respect to said main body portion, said pair of oppositely disposed detent elements being adapted to become disengaged from said detent member by the force or impact of a stone or the like on said stone guard door whereby to permit said lip portion to pivotally move about the hinged connection of said lip portion to said main body portion.

4. In a harvester as defined in claim 3 in which said detent member is carried by said lip portion and said detent elements are carried by said main body portion.

5. In a harvester as defined in claim 1 in which the improvement further includes a seal means mounted on said stone guard door in overlying relation to the hinge connection between said main body portion and said lip portion.

6. In a harvester as defined in claim 1, in which the improvement is further characterized by a rotatable shaft supported for rotation by said stationary harvester structure contiguous said feeder means, said stone guard door being mounted for pivotal movement from closed to open position and vice-versa about the axis of said rotatable shaft, and a relatching mechanism for said stone guard door comprising crank means fixed to said shaft and rotatable with said shaft, and operator means carried by said stone guard door and operatively connected to said crank means, whereby rotation of said shaft and of said crank means fixed to said shaft in a predetermined direction is effective to move said stone guard door from an open unlatched position to a latched position through the operative connection of said crank means and said operating means.

7. In a harvester as defined in claim 6 in which the improvement is further characterized by power means operatively connected to said shaft whereby to effect rotation of said shaft in said predetermined direction to cause movement of said stone guard door from an open unlatched position to a latched position.

8. In a harvester as defined in claim 7 in which said power means is a hydraulic ram.

9. In a harvester as defined in claim 1, the further improvement which comprises auxiliary detent means operatively associated with said lip portion and effective to maintain said lip portion in a fully open unlatched position for a sufficient portion of the retaining operation for said stone guard door to permit said stone guard door to move upwardly past and in clearing relation to the edge of said concave during the relatching operation.

10. In a harvester as defined in claim 6 in which said operator means is carried by said lip member and comprises a pintle member, and said crank means comprises a slot engaged by said pintle member to define a pin-and-slot connection between said operator means and said crank means, a spring-biased detent member carried by said crank means and projecting into said slot of said crank member, said pintle member being retained by said detent member in a predetermined location in said slot when said stone guard door is in open unlatched position whereby to hold said lip member in a fully open unlatched position to permit movement of said stone guard door upwardly past and in clearing relation to said edge of said concave, said pintle member being movable past said spring-biased detent member and into a different predetermined location in said slot when said lip portion of said stone guard door is in latched position relative to the main body portion of said stone guard door.

* * * * *

UNITED STATES PATENT OFFICE
CERTIFICATE OF CORRECTION

Patent No. 4,195,644             Dated April 1, 1980

Inventor(s) William G. Ryczek

It is certified that error appears in the above-identified patent and that said Letters Patent are hereby corrected as shown below:

Column 13, line 58, "for" should read --- by ---;

Column 14, line 45, "retaining" should read --- relatching ---.

Signed and Sealed this

Nineteenth Day of August 1980

[SEAL]

Attest:

SIDNEY A. DIAMOND

Attesting Officer    Commissioner of Patents and Trademarks